United States Patent [19]
Holden

[11] 3,853,369
[45] Dec. 10, 1974

[54] FOLDING TAILGATE STEP

[76] Inventor: Patrick E. Holden, 10835 Cassandra Way, Dallas, Tex. 75228

[22] Filed: Mar. 22, 1973

[21] Appl. No.: 343,791

[52] U.S. Cl.................. 296/62, 182/78, 182/91, 280/166
[51] Int. Cl............................................. B60r 3/02
[58] Field of Search.............. 296/62; 280/163, 166; 182/78, 90, 91, 95, 96; 105/447

[56] References Cited
UNITED STATES PATENTS

| | | | |
|---|---|---|---|
| 539,593 | 5/1895 | Putnam | 182/91 |
| 1,138,975 | 5/1915 | Rego | 182/95 |
| 1,169,794 | 2/1916 | Fuller | 182/95 X |
| 1,223,639 | 4/1917 | Swartsel | 296/62 |
| 3,606,382 | 9/1971 | Pollock | 280/166 |

FOREIGN PATENTS OR APPLICATIONS

| | | | |
|---|---|---|---|
| 254,090 | 7/1926 | Great Britain | 280/166 |

Primary Examiner—Robert J. Spar
Assistant Examiner—Leslie J. Paperner
Attorney, Agent, or Firm—Howard E. Moore; Gerald G. Crutsinger

[57] ABSTRACT

Folding steps connectable to the tailgate of a vehicle such that the steps are moved from a horizontal operative position when the tailgate is lowered and are moved to a substantially vertical storage position when the tailgate is raised. A lower step is secured to rigid angle members suspended from an intermediate step which is pivoted to the vehicle. The lower step is maintained in a horizontal position by adjustable braces connected through a linkage to permit folding to a collapsed position when the tailgate is raised.

8 Claims, 2 Drawing Figures

PATENTED DEC 10 1974　　　　　　　　　　　　　　　　3,853,369
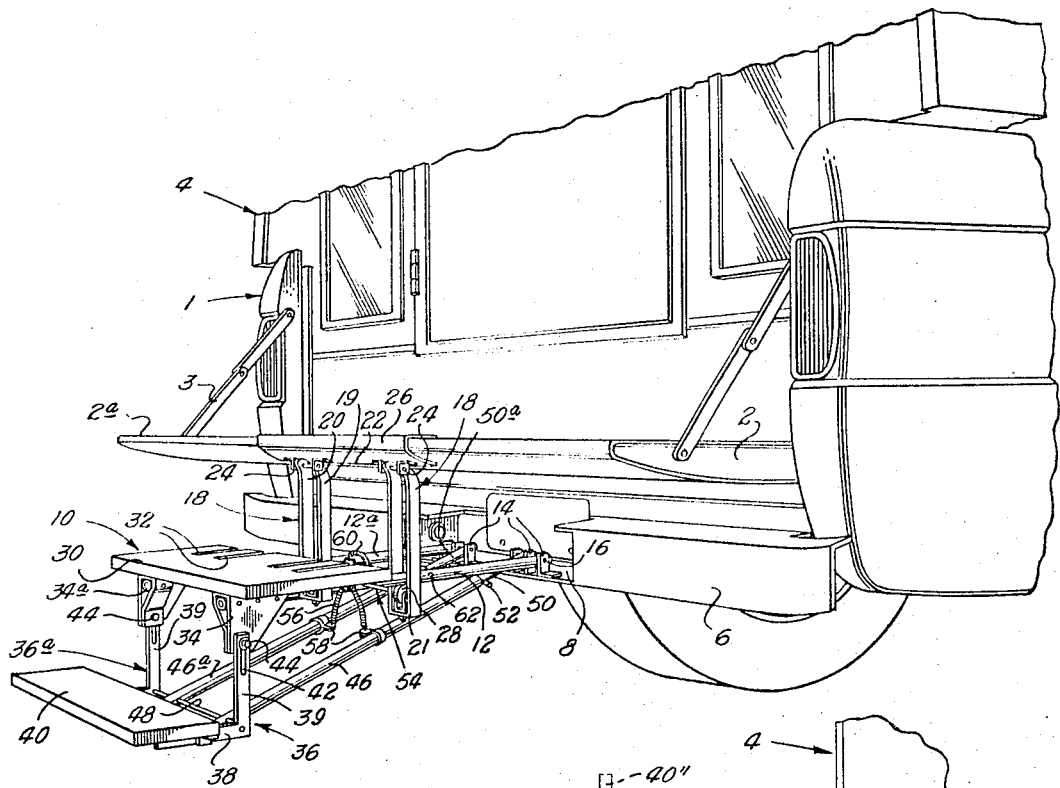
Fig. I
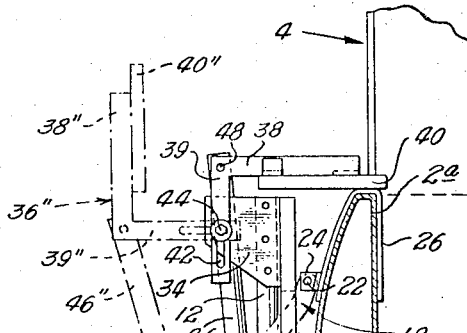
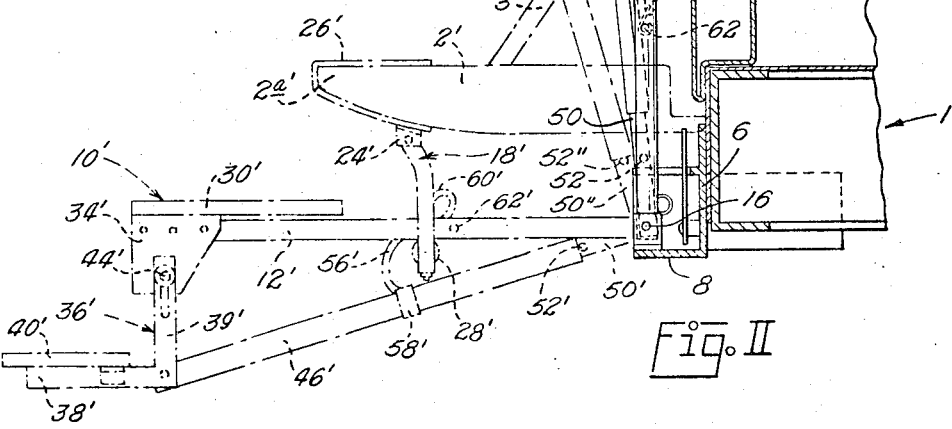
Fig. II

FOLDING TAILGATE STEP

BACKGROUND OF THE INVENTION

When a camper is mounted in the bed of a pickup truck women and children often encounter considerable difficulty in stepping from the ground to the tailgate of the pickup truck without at least one step between the ground and the tailgate.

Steps heretofore devised for use upon entering or exiting the rear of a pickup truck have comprised various forms of ladders extending between the ground and tailgate, stool-type devices arranged to sit upon the ground near the tailgate, and steps permanently or detachably secured to the bumper of the vehicle.

Steps of the type heretofore devised have generally comprised only one step positioned approximately halfway between the ground and the tailgate. Difficulty has been encountered in devising apparatus for securing such steps in a manner to assure that the step is level and sufficiently stable to assure safe entry and exit, particularly after dark.

Since most steps heretofore devised have been generally unsatisfactory or inconvenient to use, probably the most commonly employed step used for entering and exiting pickup trucks comprises a box positioned on the ground at the rear of the vehicle.

SUMMARY OF INVENTION

I have devised an improved folding step connectable to the rear of a vehicle comprising at least two steps mounted on members arranged to position the steps horizontally behind a vehicle when a tailgate is lowered, the steps being arranged like s staircase. When the tailgate is raised the members connecting the steps to the vehicle collapse to a storage position wherein the steps are folded, elevated and positioned adjacent the rear of the vehicle.

The supporting structure comprises spaced arms having ends pivoted adjacent the bumper of the vehicle and having intermediate portions suspended by a linkage to the edge of the tailgate, outer ends of the arms supporting a first step. A second step is secured by spaced angle members pivotally connected to outer ends of the arms and maintained in position by spaced brace members arranged to limit rotation of the angle members when the the tailgate is lowered.

The spaced brace members have expandable connections therein permitting the angle member to be pivoted about the end of the arms for positioning the arms, braces and the angle member adjacent the rear of the vehicle when the tailgate is raised.

A primary object of the invention is to provide folding tailgate steps connectable to the rear of a pickup truck arranged such that upon lowering the tailgate the steps will automatically be extended to form a staircase, and upon raising the tailgate the steps will be folded to a substantially flat position adjacent the rear of the vehicle.

Another object of the invention is to provide folding tailgate steps connectable to the rear of the pickup truck comprising at least two steps supported by the vehicle and positioned above the ground such that stability of steps is not dependent upon whether the ground adjacent the rear of the vehicle is level, muddy and the like.

A further object of the invention is to provide a folding tailgate step connectable to the rear of a pickup truck arranged such that upon raising the tailgate the steps will be automatically moved to a position elevated above the bumper of the vehicle to minimize the possibility of damaging the steps when the vehicle is moved across rough terrain.

A still further object of the invention is to provide folding tailgate steps connectable to the rear of the pickup by detachable connector means arranged such that permanent modifications of the vehicle is not necessary.

Other and further object of the invention will become apparent upon referring to the detailed description hereinafter following and to the drawings annexed hereto.

DESCRIPTION OF THE DRAWING

Drawings of a preferred embodiment of the invention are annexed hereto so that the invention may be better and more fully understood, in which;

FIG. I is a perspective view of the rear end of a pickup truck having foldable tailgate step structure secured thereto, the tailgate being illustrated in a lowered position; and FIG. II is a cross sectional view through the rear of a pickup truck illustrating the steps in full outline in a folded position and in dashed outlines in an operative position.

Numeral references are employed to designate like parts throughout various figures of the drawing.

DESCRIPTION OF A PREFERRED EMBODIMENT

Referring to FIG. I of the drawing the numeral 1 generally designates a pickup truck having a tailgate 2 hingedly connected to the rear end thereof, tailgate 2 being supported in a lowered position by tension carrying members 3.

The pickup truck 1, illustrated in FIGS. I and II of the drawing, has a camper 4 mounted in the bed thereof.

A bumper 6 extends across the rear end of the vehicle below the hinges connecting the tailgate 2 to the vehicle. Bumper 6 is of conventional design having a substantially flat central portion 8 arranged for connection of a trailer hitch thereto.

Numeral 10 generally designates a folding tailgate step structure secured to the rear of the vehicle 1 and secured adjacent the tailgate 2.

Spaced arms 12 and 12a have first ends pivotally connected to the rear of the vehicle by suitable means such as angle members 14 secured to the central flat portion 8 of bumper 6 forming upwardly extending lugs. Bolts 16 extend through the lugs and the inner ends of arm 12.

The intermediate portion of each of the arms 12, 12a, is supported by links 18 which pivotally secure the arms 12 to the tailgate 2. Links 18 comprise straps 19 and 20 having upper ends secured by a pin 22 to lugs 24 secured to a clamp member 26. Clamp member 26 preferably comprises a channel shaped member constructed of a suitable material, such as spring steel, arranged to grippingly engage surfaces of tailgate 2 adjacent the extremity 2a thereof.

Lower ends of straps 19 and 20 have a web 21 extending therebetween to which a roller 28 is secured.

Referring to FIG. I of the drawing it should be readily apparent that as tailgate 2 is raised links 18 will pivot about pin 22 causing arms 12 to pivot about bolts 16. Roller 28 is positioned in rolling engagement with the lower surface of arm 12, as will be hereinafter more fully explained.

A first step 30 has opposite edges secured to arms 12 and 12a by any suitable means such as rivets, bolts or spot welding.

Step 30 has slots 32 formed therein into which straps 19 and 20 will move when the tailgate 2 is raised to the position illustrated in FIG. II.

Hanger elements 34 and 34a are secured to the outer ends of arms 12 and 12a, respectively.

Rigid angle members 36 and 36a comprise legs 38 and 39 which in the particular embodiment of the invention illustrated in the drawing are disposed in right angle relationship.

Leg 38 has a second step 40 secured thereto and leg 39 has an elongated slot 42 formed therein through which a bolt 44, secured to the hanger element 34, extends.

Braces 46 and 46a have outer ends pivotally connected to angle members 36 and 36a by a pin 48 extending therebetween.

Inner ends of braces 46 and 46a are pivotally secured to arms 12 and 12a, respectively.

Brace members 46 and 46a are preferably tubular members having longitudinally extending passages formed therein. The means to pivotally secure braces 46 and 46a to arms comprise rods 50 having ends slidably disposed in the passages in the tubular members 46 and 46a and having ends pivotally secured by bolts 16 to the inner ends of arms 12 and to lugs 14.

Suitable means such as pin 52 is secured to rod 50 to limit movement of tubular brace 46 longitudinally of rod 50.

As viewed in FIG. I of the drawing, it should be readily apparent that when weight is applied to step 40 angle members 36 will tend to pivot in a counterclockwise direction about bolts 44. Braces 46 limit rotational movement of angle members 36 in a counterclockwise direction when the end of brace 46 engages the stop element 52 on rod 50 thus maintaining step 40 in a substantially horizontal position such that upper surfaces of tailgate 2, step 30 and step 40 lie in vertically spaced parallel planes.

Inner straps 19 of links 18 have a cross member 54 extending therebetween to which springs 56 are secured. Ends of springs 56 are connected by clamp elements 58 to braces 46 and 46a.

A second spring 60 is connected to cross member 54, connected between straps 18, and is connected to a cross member 62 extending between arms 12 and 12a.

The operation and function of the apparatus hereinbefore described is as follows:

When the tailgate is moved from the position illustrated in FIG. I to the position illustrated in FIG. II the steps are automatically moved from the position designated by prime numerals to the position illustrated in full outline.

As the outer extremity 2a' of tailgate 2' is elevated, links 18' exert an upward force on arms 12' which pivot about bolt 16 relative to the vehicle. As the tailgate moves toward the closed position, illustrated in full outlines, spring 60 exerts a downward force on lower ends of links 18 causing rollers 28 to roll along the surface of arms 12 such that when arms 12 are positioned in the full outline position spring 60 is applying a force tending to rotate links 18 in a counterclockwise direction about pin 22 as viewed in FIG. II. Roller 28 applies force against arms 12 tending to rotate arms 12 about bolts 16 thus urging the arms toward the surface of tailgate 2.

When arms 12 move to the full outlined position step 40 supported by rigid angle members 36 will stop in the position indicated by double primed numerals.

External force is applied against step 40 for moving bolt 44 through slot 42 in leg 39 of angle member 36 and upwardly directed external force is applied for causing the leg 39 to pivot about bolt 44 from the position 39'' to the full outline position.

It should be noted that rotation of leg 39 from the position indicated 39'' to the full outline position results in movement of brace 36 longitudinally of rod 50.

For unfolding step apparatus 10 as the tailgate 2 is lowered, step 40 is moved to the position indicated at 40'' and the tailgate is moved toward the position 2'. As brace 46 moves from position 46'' to position 46' force is exerted through spring 56 to urge roller 26 along the surface of arm 12 until link 18 is positioned as illustrated at 18'.

Having described my invention, I claim:

1. Steps connectable to a vehicle tailgate comprising: spaced arms; means to pivotally secure first ends of said arms to a vehicle; link means; means slidably securing intermediate portions of said arms to said link means; means to pivotally secure said link means to a tailgate; a first step; means securing the first step between said spaced arms; a rigid angle member; means pivotally securing said angle member adjacent second ends of said arms; brace means positioned to limit rotation of said angle member relative to said arms in one direction; means securing a first end of said brace means to said angle member; means to secure a second end of brace means to a vehicle; means to permit limited axial movement of said brace means from a first position to a second position; a second step; and means to secure said second step to the angle member.

2. Steps connectable to a vehicle tailgate comprising: an arm; means to pivotally secure an end of said arm to a vehicle; means to pivotally secure an intermediate portion of said arm to a tailgate; a first step; means to secure the first step to the arm; a rigid angle member; means pivotally securing the angle member to the other end of said arm; brace means; means pivotally securing a first end of the brace means to the angle member; means pivotally securing a second end of the brace means to said arm; means to permit limited axial movement of said brace means from a first position to a second position to limit rotational movement of said angle member relative to said arm in one direction; a second step; and means securing said second step to the angle member.

3. The combination called for in claim 2 wherein the means to permit axial movement comprises, a rod; means to pivotally secure said rod to said arm; and wherein said brace comprises a tubular member having a longitudinally extending passage, said rod having an end slidably disposed in said passage.

4. Steps connectable to a vehicle tailgate comprising: an arm; means to pivotally secure an end of said arm to a vehicle; means to pivotally secure an intermediate portion of said arm to a tailgate; a first step; means securing the first step to the arm; a rigid angle member; means pivotally securing the angle member to the other end of said arm; means permitting limited linear movement of said angle member relative to said arm; brace means; means pivotally securing a second end of the brace means to said arm to limit rotation of said angle member relative to the arm in one direction; a second step; and means securing the second step to said angle member.

5. Steps connectable to a vehicle tailgate comprising: an arm; means to pivotally secure an end of said arm to a vehicle; means to pivotally secure an intermediate portion of said arm to a tailgate; a first step; means securing the first step to the arm; a rigid angle member having an elongated slot formed therein; a projection on the arm extending into said slot pivotally securing angle member to the other end of said arm; brace means to limit rotation of said angle member relative to the arm in one direction; a second step; means securing said second step to the angle member; means to pivotally secure a first end of the brace means to the angle member; and means to pivotally secure a second end of the brace means to said arm.

6. Steps connectable to a vehicle tailgate comprising: an arm; means to pivotally secure an end of said arm to a vehicle; a first step; means securing the first step to the arm; a rigid angle member; means pivotally securing the angle member to the other end of the arm; means engageable with said angle member adapted to limit rotation of said angle member relative to the arm in one direction; a second step; means securing said second step to the angle member; link means; means to pivotally secure a first end of the link means to a tailgate; roller means positioned in rolling engagement with said arm; and means pivotally securing the roller means to the second end of the link means.

7. The combination called for in claim 6 with the addition of resilient means secured between said arm and said link means.

8. The combination called for in claim 6 wherein the means to pivotally secure the first end of said link means to a tailgate comprises, clamp means connectable to a tailgate; and means to pivotally secure the first end of the link means to said clamp means.

* * * * *